United States Patent [19]
Jones et al.

[11] 4,018,271
[45] Apr. 19, 1977

[54] FLOORING SYSTEM

[76] Inventors: Robert S. Jones, R.R. 3 Box 79A, Pontiac, Ill. 61764; Wesley E. Jones, R.R. 1, Chestnut, Ill. 62518; Harry W. Smathers, 17 Knollwood Drive, Aurora, Ill. 60538

[22] Filed: Feb. 24, 1975

[21] Appl. No.: 552,285

[52] U.S. Cl. .............................. 165/175; 119/28; 138/111
[51] Int. Cl.² ............................................ F28F 9/02
[58] Field of Search ............... 165/175, 76, 137; 119/28; 47/18; 138/111; 29/157.4; 285/3, 4

[56] References Cited
UNITED STATES PATENTS

| | | | |
|---|---|---|---|
| 469,044 | 2/1892 | Jungbluth | 119/28 |
| 3,086,369 | 4/1963 | Brown | 138/111 X |
| 3,670,812 | 6/1972 | Bemrose | 165/175 |
| 3,809,014 | 5/1974 | Jones et al. | 119/28 |
| 3,815,550 | 6/1974 | Becker | 119/28 |
| 3,826,230 | 7/1974 | Jones et al. | 119/28 |
| 3,866,670 | 2/1975 | Cramer et al. | 138/111 X |

FOREIGN PATENTS OR APPLICATIONS

| | | | |
|---|---|---|---|
| 1,375,437 | 7/1964 | France | 165/175 |
| 510,810 | 8/1939 | United Kingdom | 165/175 |
| 662,820 | 12/1951 | United Kingdom | 165/175 |

*Primary Examiner*—C. J. Husar
*Assistant Examiner*—Daniel J. O'Connor
*Attorney, Agent, or Firm*—Evan D. Roberts

[57] ABSTRACT

A flooring system for sties and other animal shelters having thermoplastic slats, means provided in the slats for circulating a heat exchange fluid therethrough to heat or cool the flooring, means for joining the slats into a floor panel, and manifolds for enclosing the adjacent ends of the slats.

7 Claims, 8 Drawing Figures

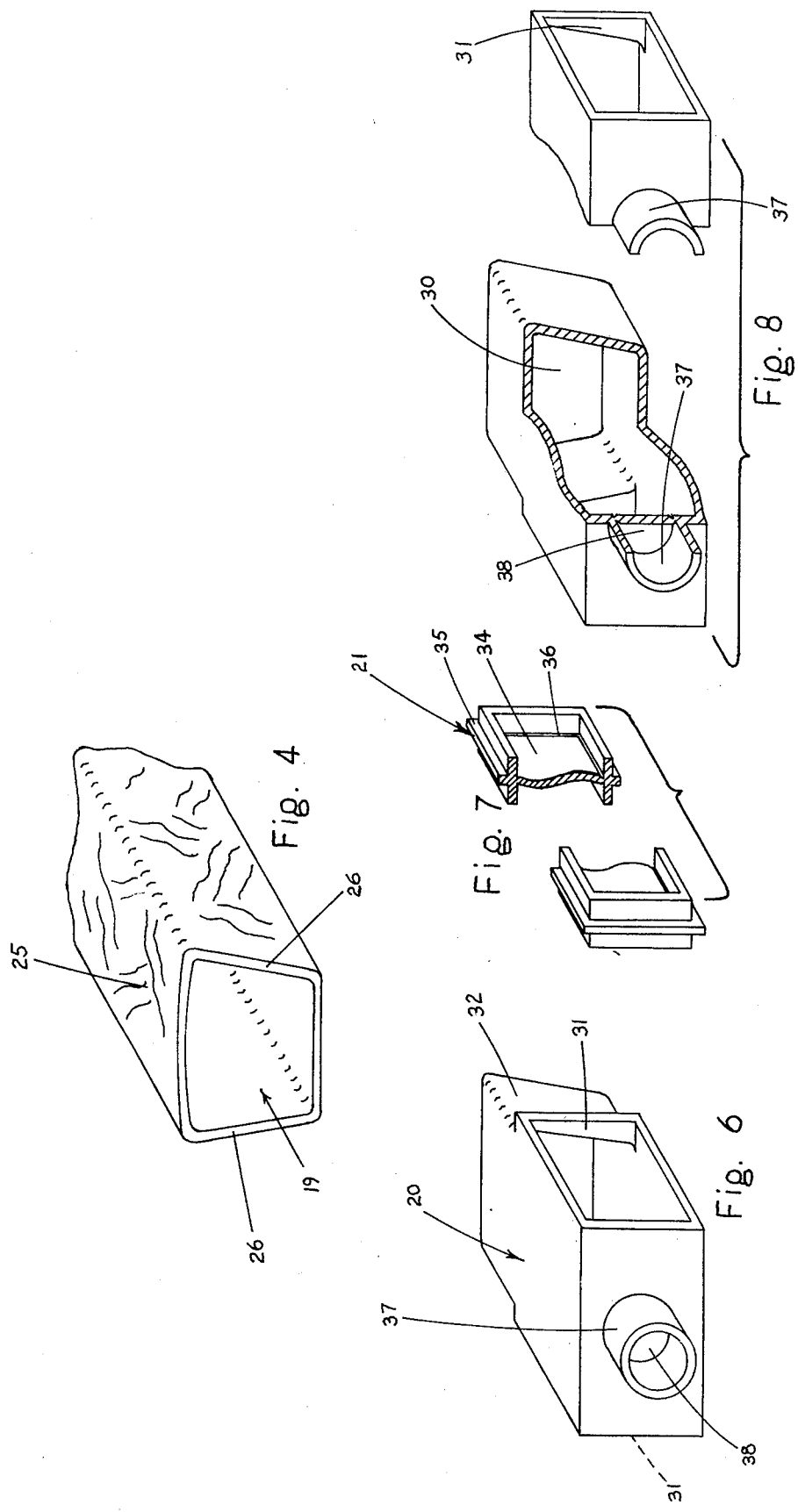

4,018,271

FLOORING SYSTEM

SUMMARY OF THE INVENTION

The present invention relates to a flooring system and more particularly, to a flooring system that is most appropriately adapted for sties and which is easily installed; easily maintained; is noncorrosive; is easily assembled into a floor panel; is adapted for cooling and heating to provide comfort to the confined animals of the sty or other structure; and is provided with enclosure manifolds to enclose the slats and direct heating and cooling fluid therethrough.

BACKGROUND OF THE INVENTION

For thousands of years, farm animals were raised out-of-doors, seasonally, in an open field. Recently, however, due to the cost of land, the enlightened farmer and advanced technology in equipment and foods, the raising of animals has been brought indoors and is a year-round activity.

A major problem in raising animals indoors is one of sanitation, in that tons of manure are excreted by a single animal during its short life span. Another problem is providing climate comfort to the animals during both the winter and summer seasons.

The development of flooring systems for indoor shelters has progressed steadily over the past few years from concrete flooring, to concrete slotted flooring, to steel slat flooring, to aluminum slat flooring, and then to plastic slat flooring. All these prior floorings have advantages and disadvantages with respect to the sanitation and the heating and cooling problems. Concrete chips and corrodes and is difficult to keep clean; steel and aluminum are great heat conductors and are either hot or cold depending on the ambient temperature of the air of the shelter.

An object of the present invention is to improve the floor of a shelter by providing better materials of construction and to provide a better assemblage of slats and easier installation and maintenance of the flooring.

Another object of the invention is to provide simple but novel heating and cooling of the flooring.

A further object of this invention is to provide a pair of segmented manifolds to selectively enclose and direct heating and cooling fluid through the flooring.

Other objects and advantages will be apparent from the following detailed description of the flooring system, taken in conjunction with the appended drawings wherein:

FIG. 4 is a perspective end view of a slat used in the assembly of the floor;

FIG. 6 is a perspective view of a fluid coupler segment member of the fluid manifold for the slats of the flooring of FIG. 1;

FIG. 7 is a partial perspective view of the knockout plug panel of the manifold; and FIG. 8 is a partially sectioned and exploded view of the manifold coupler joint.

DESCRIPTION OF THE INVENTION

Figure 1:
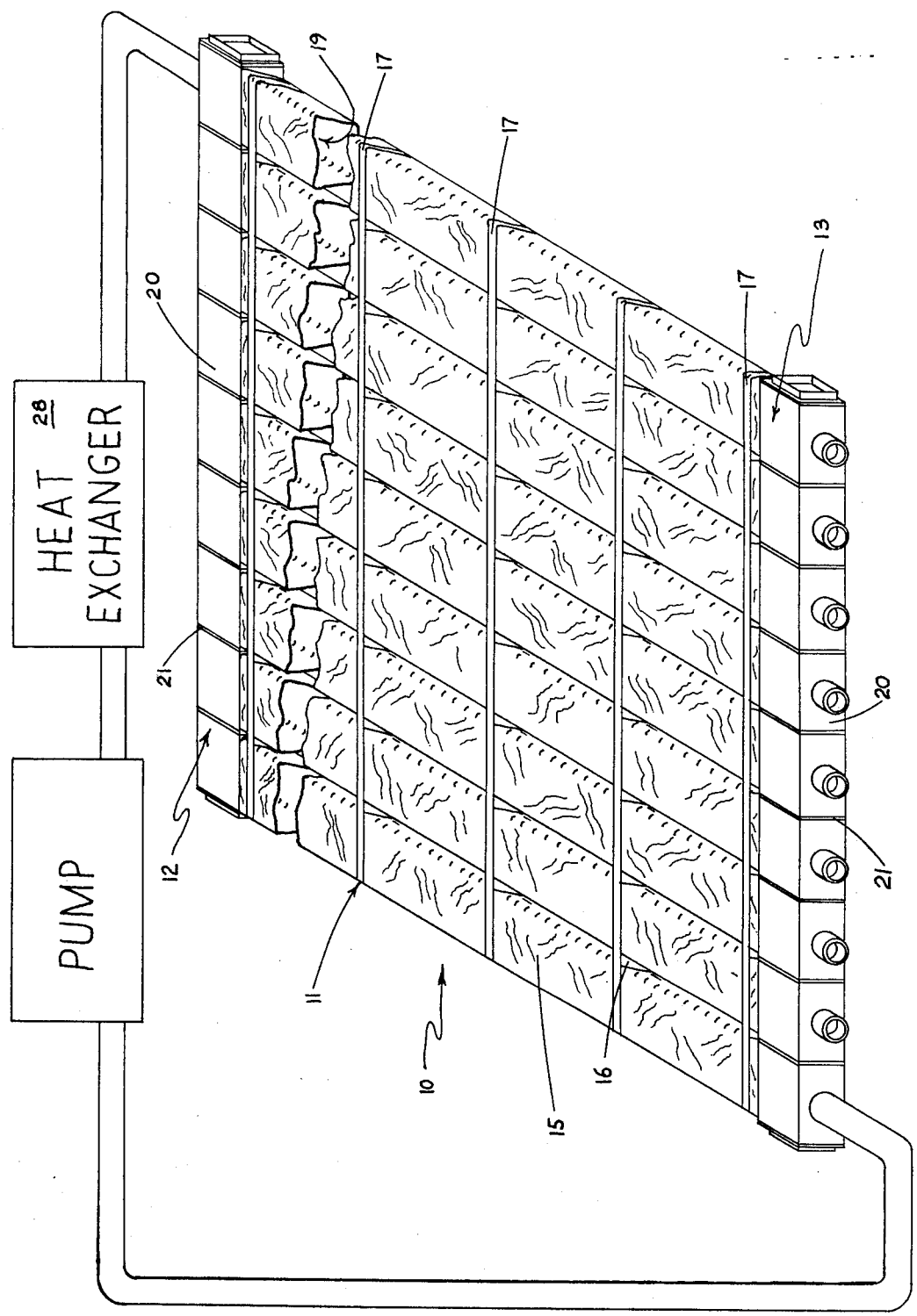
FIG. 1 is a perspective view of a floor for an animal shelter made in accordance with the present invention.
Figure 5:
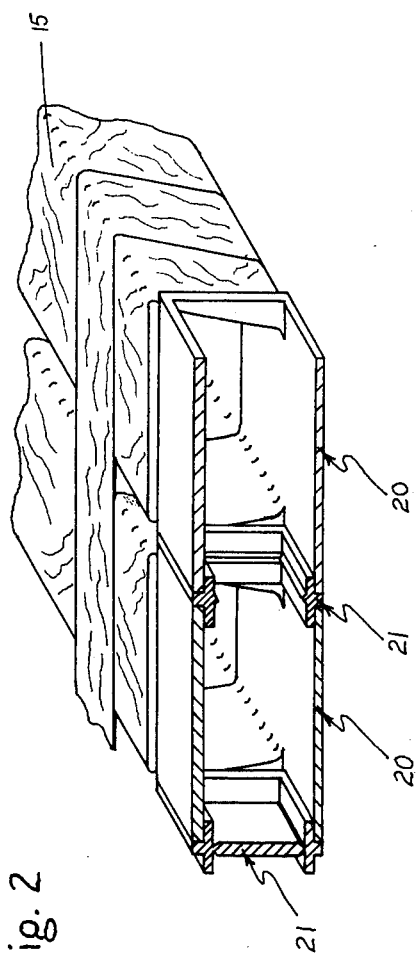
FIG. 5 is a sectional view taken along line 5—5 of FIG. 1 showing two segments of the manifold interconnected by a knockout plug panel.

The flooring system of this invention (FIG. 1) includes generally, floor 10, joining means 11, and fluid manifolds 12 and 13. Floor 10 (FIGS. 1–8) includes tubular slats 15 and joining means 11 includes a molded adhesive spacer plug 16 and tension bands 17. Fluid manifolds 12 and 13 (FIGS. 1 and 5–8) include segmented fluid couplers 20 joined together by a plurality of manifold coupler joints 21.

Slats 15 (FIGS. 1, 3 and 4) are shown as an elongated, trapezoidal-shaped tube having a top wall 25, side walls 26 and 27, and a bottom wall 28. Side walls 16 and 17 are inclined inwardly to provide for easier egress of manure between the slats 11 into a drainage pit therebelow (not shown). Tubular fluid passage 19 is provided in slats 15 to receive heated or cooled fluid from a conventional heat exchanger 28 and through manifolds 12 and 13.

Figure 3:
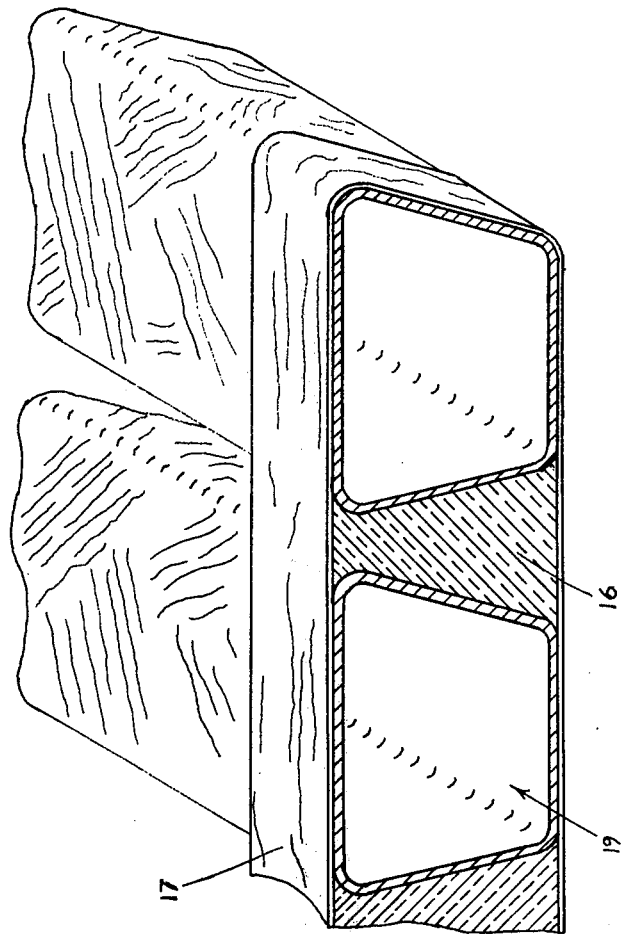
FIG. 3 is a perspective sectional view of the slats of the floor system showing the means for joining and spacing the slats with a panel.
Figure 2:
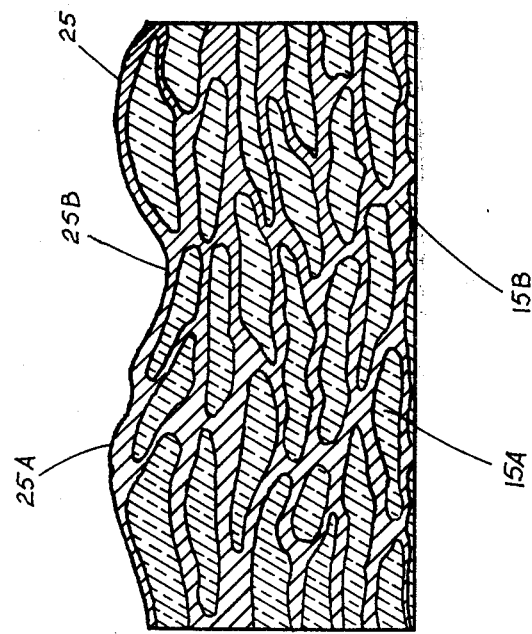
FIG. 2 is a cross-sectional view of the improved slat utilized in the present flooring system.

Slats 15 are assembled into laterally adjacent and parallel planar series to form a floor panel by placing slats in a jig which positions slats 15 as shown (FIG. 1). Then a mold is placed over slats 15 to allow the adhesive to be molded therein and around the slats (FIG. 3). Tension bands 17 are then placed therearound to further return slats 15 in position on adhesive 16 as it becomes hard.

Slats 15 can be made of extruded thermoplastic material such as polyvinylchloride, polystyrene or ABS (graft copolymer or acrylonitrille, butadiene and styrene), or a resin and fiberglas build-up. Other and suitable extrudable materials such as, for example, aluminum, may be employed in fabricating slats 15. However, the preferred material for slats 15 is wound fiberglas filament 15A and resin 15B whereby the inside passage surfaces of slats 15 are smooth and the outer upper floor surface 25 has ridges 25A and recesses 25B.

These ridges 25A and recesses 25B of surface 25 of slats, provide a surface which will not tend to form puddles and which will drain regularly as the floor is used by livestock. Also, surface 25 is slightly crowned or domed laterally (not shown in detail) so that waste fluids will tend to run off laterally. As a result of the ridges and grooves, and slight crown in slats 15, slats tend to drain regularly and thereby present a dry slat surface.

Manifold segment couplers 20 each have a slat insert sleeve 30 adapted to be complementally inserted within slat fluid passage 19 of a respective slat, and secured thereto for a fluid-tight seal by cementing, solvent welding, heat welding, brazing, or the like. Lateral openings 31 are provided in each coupler whereby adjacent couplers have the lateral openings adjacent each other. Coupler joints 21 (FIG. 7) are provided between adjacent couplers 20 and are provided with sleeve inserts 32 on opposite sides of a plug panel 34 and a flange 35. Sleeve inserts are respectively complemental with and insertable in, adjacent coupler lateral openings 31, and are securable thereto by adhesive or fusion means, etc. to normally seal couplers 20 from fluid flow therebetween through the lateral openings 31 thereof.

Coupler joints 21 thereby normally provide a seal between couplers 20. However, panel plugs 34 are provided with reduced thickness perforations 36 around the inner periphery of sleeves 32 whereby panel 34 is frangible from its coupler joint 21 and may be knocked out of its joint 21 to selectively provide an opening therethrough. Thus, joint 21 normally seals adjacent couplers 20 but is frangible to selectively allow fluid connection therebetween, if desired. Also, joint 21 can serve as an end coupler of each manifold 12 and 13.

Each coupler segment 20 is provided with a conduit 37 normally sealed by a frangible wall plug panel 38. In particular, each plug is provided with a reduced or perforated peripheral portion adjacent the inside diameter of conduits 37. Thus, conduits 37 are normally sealed by plug panels 38, but can be opened by merely knocking out panel plugs 38 as selectively desired.

The flooring system 10 of this invention is provided with temperature controlling fluid by pump 40 through heat exchanger 28, and conduit 41 secured to conduit 37 of the end manifold coupler 20, which has had the panel plug removed therefrom. The fluid thus is caused to pass into manifold 13 and into slat 15 connected thereto, and into the end manifold coupler 21 of manifold 12. Thence, the fluid will be caused to pass into adjacent manifold coupler 21 of manifold 12 in the panel 38 of the joint 21 therebetween being removed thence back through adjacent slat 15 and into the next adjacent coupler 21 of manifold 13.

The temperature control fluid is thus manipulated back and forth through slats 15 between manifolds 12 and 13, and out through conduit of end coupler 21 of manifold 12 and into conduit 42, back to pump 40.

Thus, the present flooring system is noncorrosive to cement and metals, is easily constructed and maintained, and provides for heating and/or cooling of the flooring in an efficient manner.

While only one preferred embodiment of the invention has been described, it is understood that other changes and modifications can be made without departing from the spirit of the invention which is set forth in the claims.

What is claimed is:

1. A flooring system comprising elongated tubular slats having given shaped end openings adapted to pass fluid therethrough, means for laterally joining said slats in a laterally adjacent and parallel planar series to form a floor panel, a pair of fluid manifolds for respectively enclosing opposite ends of said slats of said floor panel, said manifolds each being a series of segmented fluid couplers having openings respectively complemental to and longitudinally connected with said slat openings to form longitudinal fluid passing extensions of said slats, said manifold coupler segments having given shaped lateral openings adjacent said slat ends, and coupler joints having outwardly opposed surfaces complemental to adjacent ones of said lateral segment openings and secured to said manifold segments between adjacent segment openings to normally engage said lateral segment openings to seal and separate said adjacent lateral openings and for joining adjacent coupler segments to form said manifolds.

2. A flooring system as defined in claim 1 wherein said coupler joints are provided with a frangible wall normally extending laterally across said adjacent coupler openings to normally seal said openings to prevent passage of fluid between said coupler joints, whereby said wall could be selectively broken out of said coupler joint to provide a passage interconnection between said adjacent manifold couplers.

3. A flooring system as defined in claim 1 wherein said manifold couplers are provided with a frangible panel, and a conduit enclosing said frangible panel and extending from said coupler to open into said coupler enclosure when said frangible panel is removed.

4. A flooring system as defined in claim 1 wherein said coupler joints are provided with a frangible wall normally extending laterally across said adjacent coupler openings to normally seal said openings to prevent passage of fluid between said coupler joints, whereby said wall could be selectively broken out of said coupler joint to provide a passage interconnection between said adjacent manifold couplers, and wherein said manifold couplers are provided with a frangible panel, and a conduit enclosing said frangible panel and extending from said coupler to open into said coupler enclosure when said frangible panel is removed.

5. A flooring system as defined in claim 1 wherein said tubular slats are provided with a laterally domed surface to provide individual drainage of said slats.

6. A flooring system as defined in claim 1 wherein said tubular slats are provided with laterally extending grooves and ridges for a floor surface to provide lateral drainage for said slats.

7. A flooring system as defined in claim 5 wherein said tubular slats are provided with laterally extending grooves and ridges for a floor surface to provide lateral drainage for said slats.

* * * * *